Sept. 28, 1937. H. W. WILLIAMS ET AL 2,094,337
SIGNALING SYSTEM
Filed Jan. 19, 1935   5 Sheets-Sheet 3
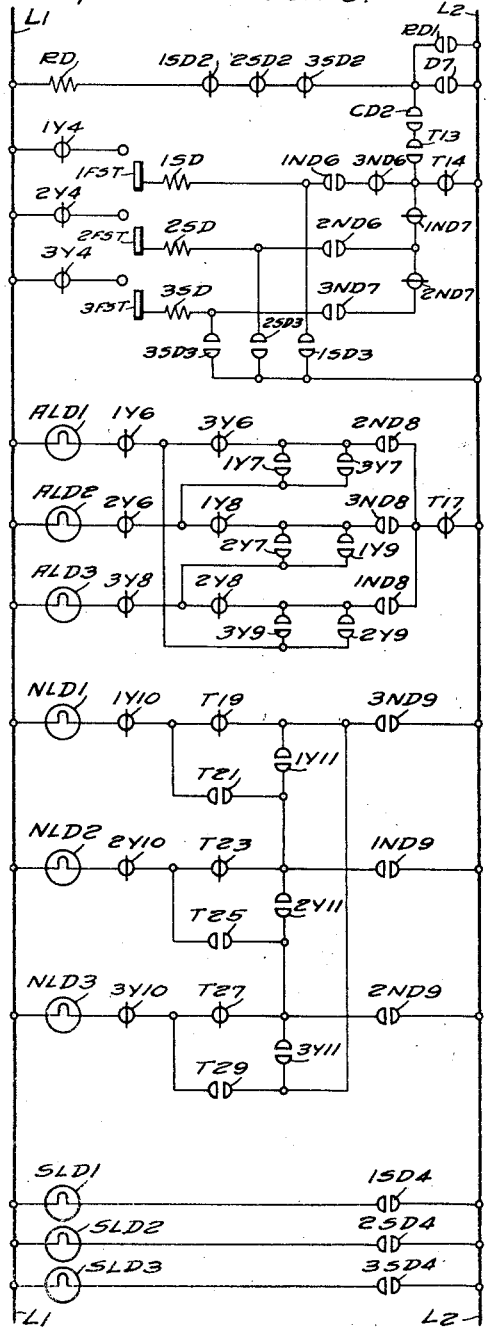
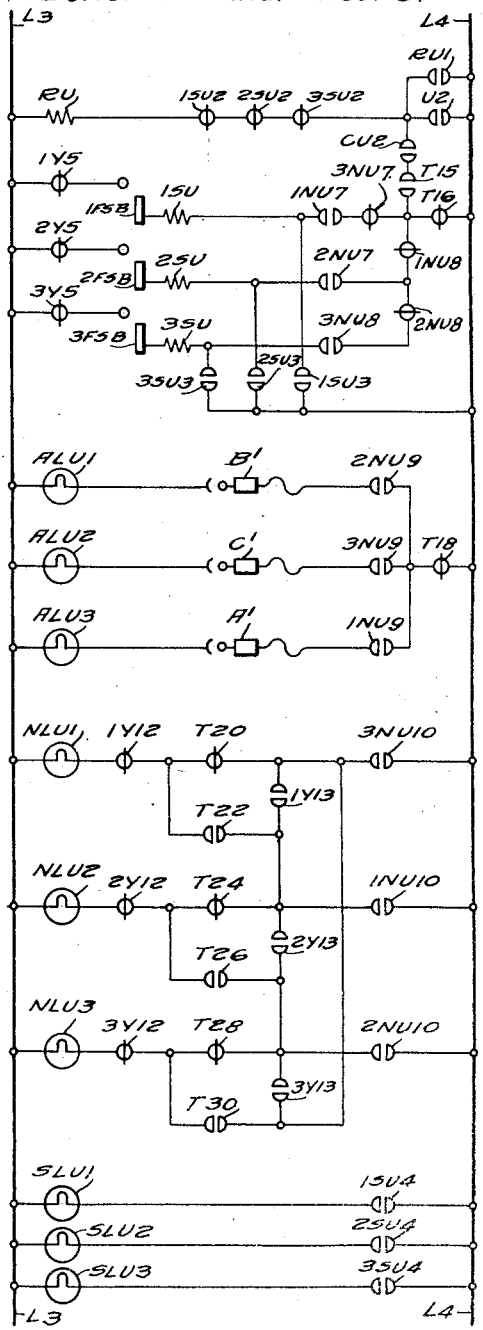
Fig. 4
WITNESSES:
E.A. McCloskey
R.R. Lockwood
INVENTORS
Harold W. Williams
and Charles E. Ellis Jr.
BY W.R. Coley
ATTORNEY Patented Sept. 28, 1937

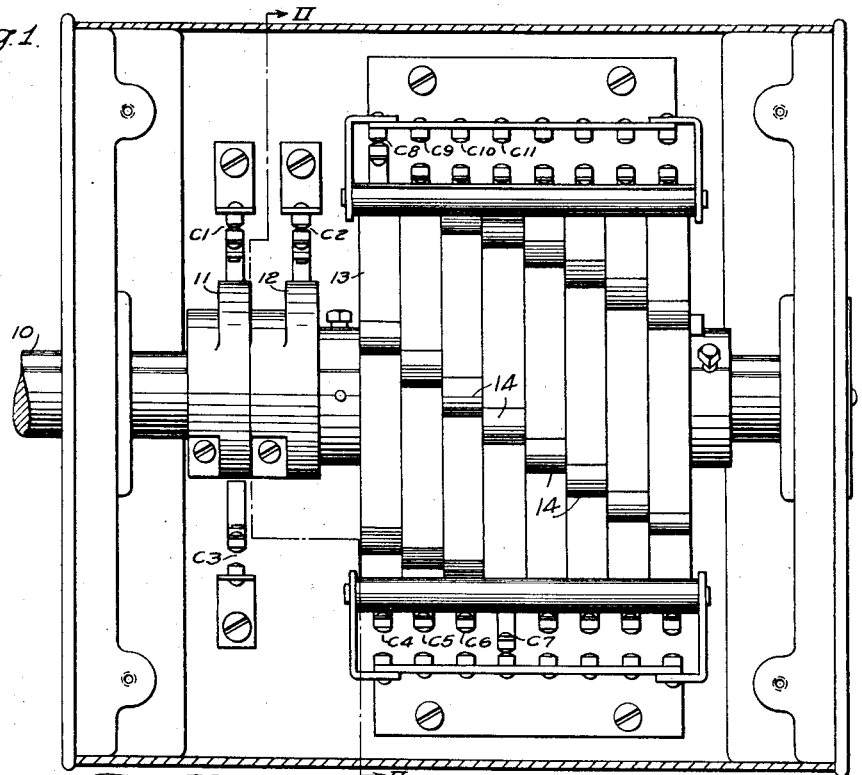
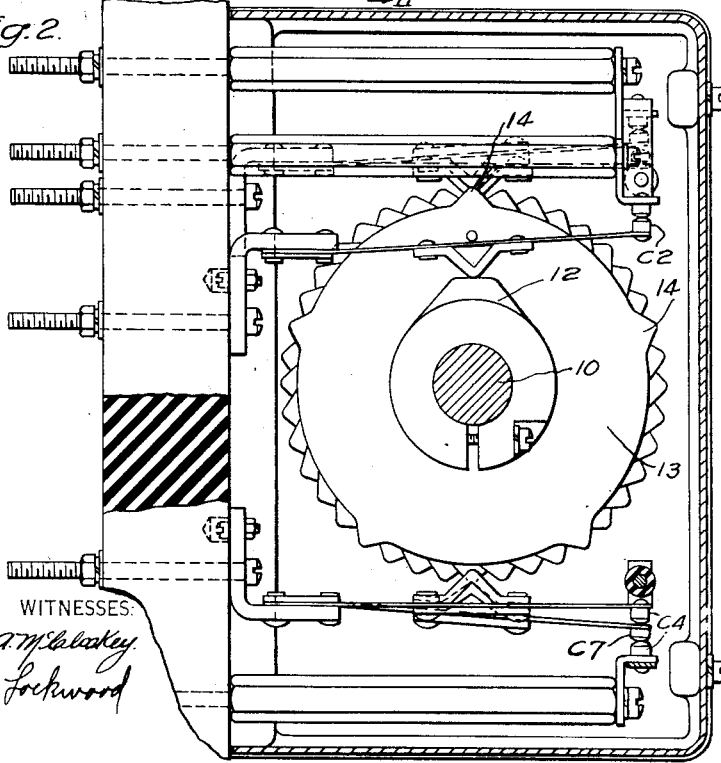

2,094,337

UNITED STATES PATENT OFFICE 2,094,337

SIGNALING SYSTEM

Harold W. Williams, Chicago, Ill., and Charles E. Ellis, Jr., Mahwah, N. J.; said Williams assignor to Westinghouse Electric Elevator Company, Chicago, Ill., a corporation of Illinois, and said Ellis assignor to Arthur G. Blair, Inc., a corporation of New York Application January 19, 1935, Serial No. 2,530

20 Claims. (Cl. 177—336)

This invention relates, generally, to electrical signaling systems, and it has particular relation to dispatching systems for elevator cars.

When a bank of elevator cars is installed, it is customary to provide a dispatching system for it, in order to operate the cars in the most efficient manner, keep the cars on a schedule, and give the maximum service to the floors. Two systems have been developed for providing dispatching systems to operators in the elevator cars of a bank of cars. These systems are known as the rotational system and the non-rotational system.

When the signals in the elevator cars are operated by the rotational system, the start signals are given in a predetermined order and at predetermined intervals to each car. According to this system, the elevator cars are dispatched from either terminal in a predetermined sequence, regardless of their time of arrival at the terminal.

When the non-rotational dispatcher system is used, the elevator cars are caused to leave the terminals in the order in which they arrive at the terminals. No attempt is made to keep each car in its place in a sequence. The start signal is given to the car first arriving at the terminal at the time when a car should normally leave that terminal.

The rotational system of dispatching has the advantage that it keeps the cars in a predetermined sequence. The starter at the main loading terminal knows in advance which car is leaving next and it is easier for him to direct the flow of traffic. When this system is used, it is possible to provide signals to the operator to indicate that he is behind his schedule, and as the result, there is a tendency to speed up the operation of the elevator system, due to the fact that the operators will naturally attempt to maintain the predetermined schedule.

In many instances, however, the non-rotational system of dispatching offers advantages over the rotational system. Where some cars in a bank of cars serve more floors than other cars, the operating time between the lower and upper terminals will be different. It is, therefore, difficult to arrange a schedule for such a condition, and it is desirable to dispatch the cars from the terminal at predetermined intervals in accordance with their arrival at the terminals, rather than in accordance with a fixed schedule for each car. In the non-rotational system, more cars can be kept in service, in view of the fact that the waiting time at the terminals may be decreased. It is unnecessary to await the arrival of the next car in the schedule, since the first car arriving at the terminal is the first car which leaves it.

A given elevator bank may be operated at some times more advantageously under the control of a rotational dispatching system, and at other times, it may be more desirable to operate it under the control of a non-rotational dispatching system. These different conditions especially occur in office buildings, where peak loads are applied to the elevator system at morning, noon and evening, when large numbers of people are entering or leaving the building.

It is, therefore, the object of this invention, generally stated, to provide for operating a bank of elevators under the control of either a rotational or a non-rotational dispatching system.

An important object of the invention is to provide for giving dispatching signals to operators in a plurality of elevator cars in a predetermined sequence.

Another important object of the invention is to provide for giving dispatching signals to operators in a plurality of elevators cars in a sequence, depending upon the arrival of the cars at a terminal.

A further object of the invention is to provide for giving dispatching signals to operators in a plurality of elevators cars at the top terminal in a fixed relation relative to the dispatching signals given to the operators at the bottom terminal.

Still another object of the invention is to provide for giving dispatching signals in a predetermined sequence to operators in cars of an elevator bank remaining in service when some of the cars have been removed from service.

Other objects of the invention will, in part, be obvious and, in part, appear hereinafter. The invention, accordingly, is disclosed in the embodiment hereof shown in the accompanying drawings, and comprises the features of construction, combination of elements and arrangement of parts which will be exemplified in the construction hereinafter set forth, and the scope of the application of which will be indicated in the appended claims.

For a more complete understanding of the nature and scope of the invention, reference may be made to the following detailed description, taken in connection with the accompanying drawings, in which:

Figure 1 is a view, in front elevation, of a timer switch;

Fig. 2 is a sectional view, taken along the line II—II of Fig. 1;

Figure 3:
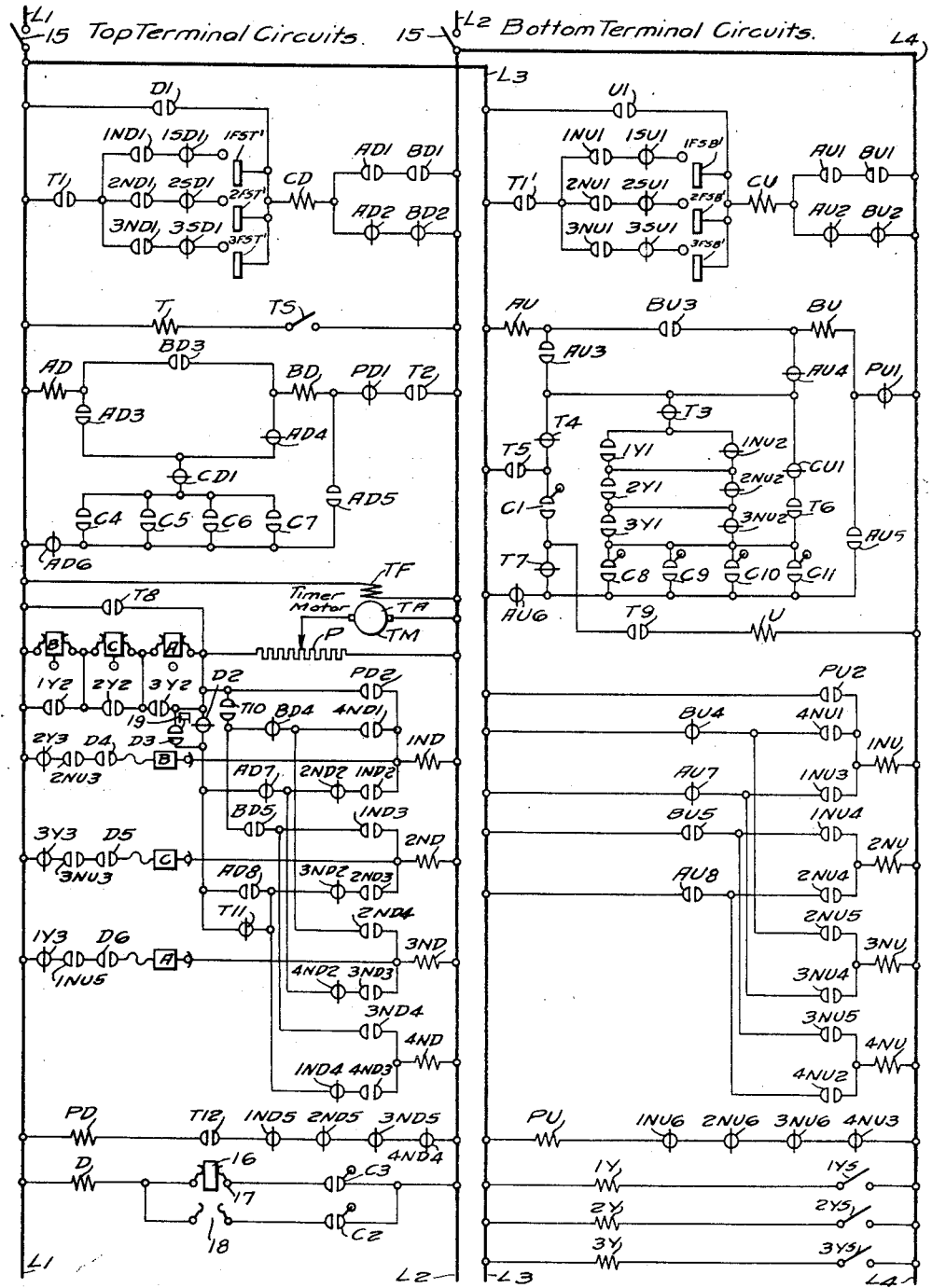
Figure 5:
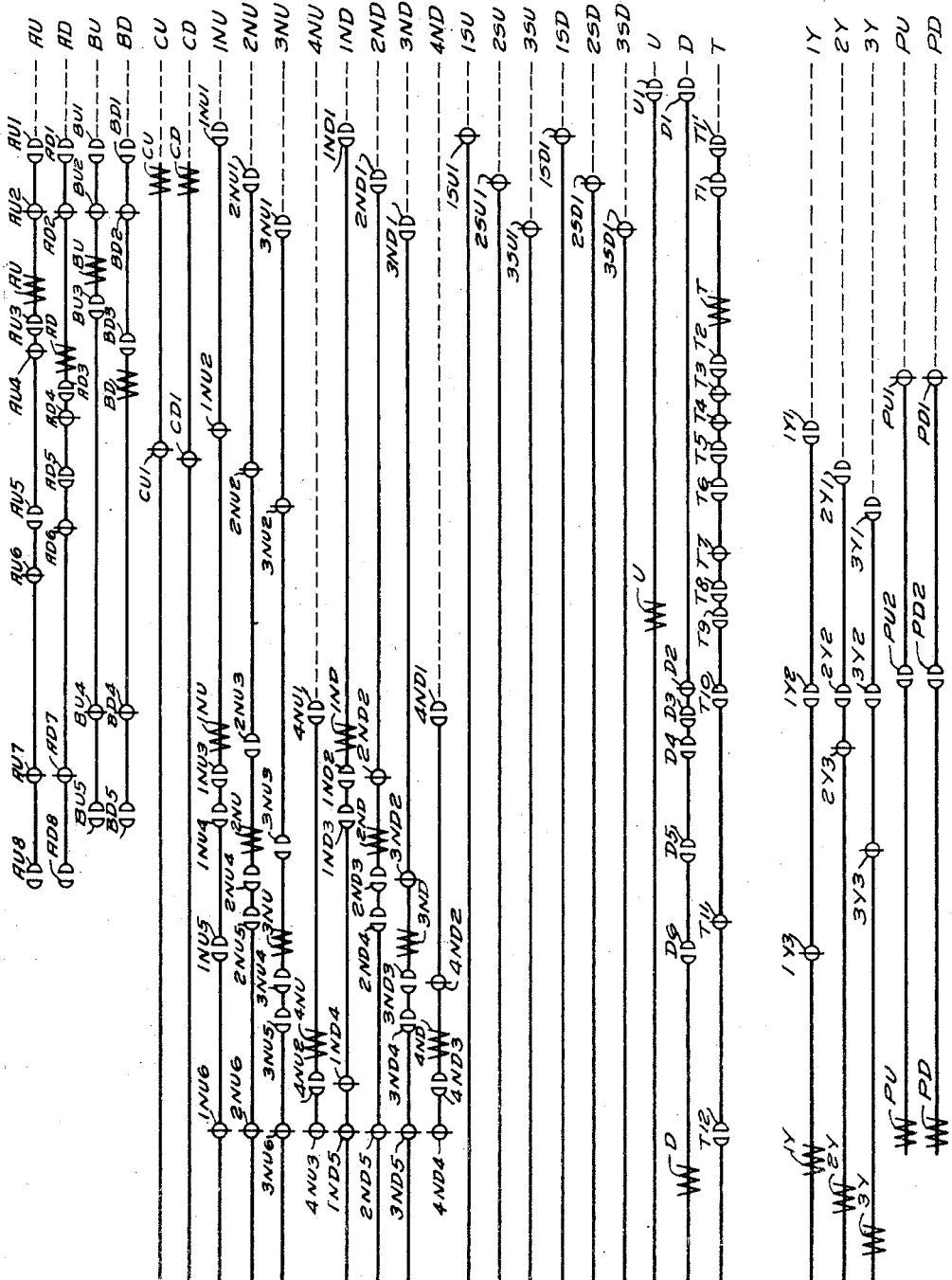
Figure 6:
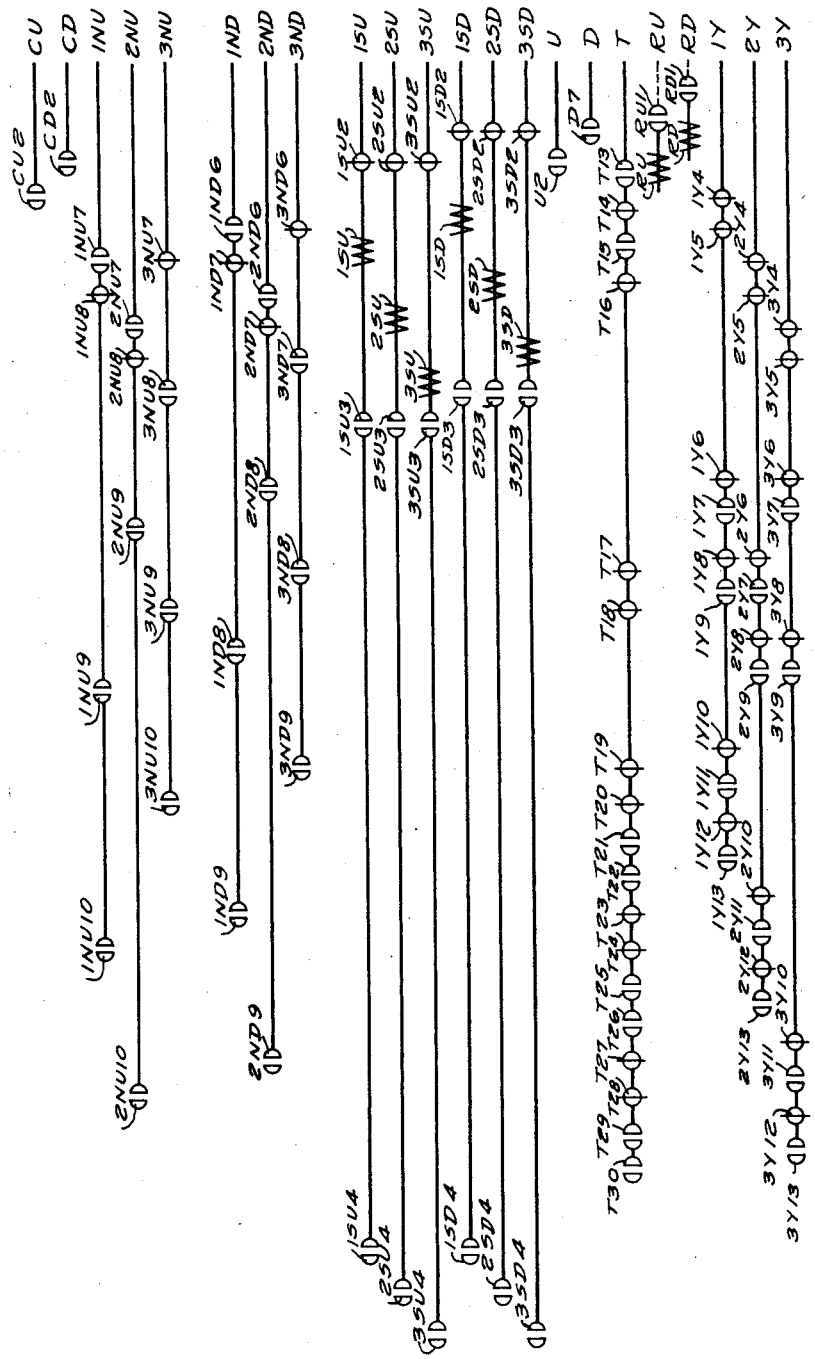

Figs. 3 and 4 are diagrams which illustrate a concrete embodiment of the invention; and Figs. 5 and 6 illustrate the relative arrangement of the contact members on the various relays which are illustrated in Figs. 3 and 4.

A general description of both the rotational and the non-rotational dispatching systems will be given, together with an indication of the apparatus which is common to both of them. A detailed description will then be given of the timer switch or contact device, the method of tracing circuits, the rotational system and the non-rotational system. For the purposes of illustration, and to reduce the circuit complications to a minimum, so that the features of the invention may be more readily understood, it has been applied to an elevator bank comprising only three cars. It will be understood, however, that the invention may be practiced for controlling the dispatching signals of a larger number of elevators, and in fact, it is contemplated that it shall be so used.

General description of the rotational dispatcher system

In order to keep the operators of the elevator cars of a bank informed as to the position which their respective cars should be in at any particular time, each of the cars is provided with six signals, three for up indication, and three for down indication. These signals are preferably in the form of lamps which may be lighted to illuminate the desired signal. The three up signals comprise an advance, a next, and a start signal, while the three down signals comprise the same sequence. Thus, when car No. 1 is to start from the lower terminal, its start-up signal will be operated, or in this case, the start-up lamp will be lighted. At the same time, the next-up lamp of the No. 2 elevator will be lighted, and the advance-up light of the No. 3 elevator will be lighted. It will be understood that the same sequence of operation will maintain when the cars are dispatched from the upper terminal, it being assumed that the order of dispatching is as indicated, that is, car No. 1 first, car No. 2 second, and car No. 3 last.

In order to operate the sequence in each car, a relay chain is provided for each terminal. Each relay chain includes a relay which is individual to each car, and when operated, is effective to cause the signals to be displayed to the various operators as set forth above.

In the rotational system, the relay chain associated with the lower terminal is driven by means of a pair of chain-driving relays, while the relay chain associated with the top terminal is driven in response to the operation of the other relay chain. The chain-driving relays are, in turn, controlled by contact members which are arranged to be periodically closed by means of a timing motor.

In the event that, for any reason, it is desirable to take one of the cars out of service, while still maintaining the remaining cars under the control of the rotational dispatcher, plugs and jacks are provided, which may be so arranged as to operate the remaining cars in the proper sequence. When the start signal of the car out of service would normally be operated, auxiliary contacts are provided, which shunt the main contacts driven by the timing motor, and cause the system to rapidly step to the car which is next in the sequence.

Each of the start signals in the cars is provided with a start relay, which may be energized only when the car individual thereto is at a terminal. If a car fails to receive its start signal before the next start signal is given, then that car must wait until its signal again is given in the sequence. This operation is desirable in order to maintain the cars on the fixed schedule, where such operation is desired.

General description of the non-rotational dispatcher system

When it is desired to transfer the elevator bank from the control of the rotational system to the control of the non-rotational system, it is only necessary to operate a transfer switch which, in turn, effects the operation of a transfer relay, and also to remove the plugs which are used for providing the desired sequence of operation in the rotational system. The operation of the transfer relay opens and closes all of the circuits which are necessary to effect a transfer of the common equipment from rotational to non-rotational control.

When the non-rotational system is employed, only the next and start signals are used in each car. In view of the fact that the cars do not, under the control of this system, operate on a predetermined schedule, it is not feasible to use the advance light, since, in many instances, it would give a false indication as to the subsequent dispatching signal which the operator might receive.

In the non-rotational system, the same relay chain, chain-driving relays, and timing motor driven contacts that are used in the rotational system, are also employed. However, in view of the fact that the top and bottom terminals are necessarily independent, two complete sets of timing equipment are provided. However, the contact members which control the operation of the chain-driving relays are driven by the same timer motor.

According to the invention, the elevator cars operate normally on the same schedule as is provided in the rotational system, that is, each car has a definite time to leave. However, if any car arrives at a terminal ahead of its scheduled time, it will be the car to receive the next start signal at the time when the next car normally in the sequence would leave, even though that car has arrived at the terminal. This functioning is accomplished by a stepping relay and auxiliary contact members, which are effective to step the driving relays until the start signal of the car next in the sequence and at the terminal, is operated.

In the event that there is no car at a terminal when a start signal is given, a signal storing relay is operated, which retains the signal until a car reaches the terminal. The start signal is then immediately given to this car, and it leaves the terminal at once.

Timing contact device

Referring now particularly to Figs. 1 and 2 of the drawings, it will be observed that the timing contact device for providing the desired schedule is there illustrated. As shown, the device comprises a shaft 10, which may be driven by means of the timer motor TM, that is shown diagrammatically in Fig. 3 of the drawings. The shaft 10 has mounted thereon a cam 11, which is arranged to cause main contact members C1 to engage once during each revolution. The cam 11 is also arranged to cause secondary contact members C3 to engage once during each revolution.

When the contact members C1 are engaged, a start signal for one of the cars at the bottom terminal, is normally given. When the contact members C3 are engaged, the start signal is normally given to a car at the top terminal. It will then be understood that cars are alternately dispatched from the bottom and from the top.

In the event that it is desired to dispatch a car from the top at the same time that a car is dispatched from the bottom, a cam 12 is provided on the shaft 10, and is arranged to cause secondary contact members C2 to engage at the same time that contact members C1 are caused to engage. It will then be understood that secondary contact members C2 and C3 are associated with the top terminal, and that main contact members C1 are associated with the bottom terminal. These contact members are illustrated diagrammatically in Fig. 3 of the drawings, and their operation in the system will be set forth in detail hereinafter.

In the event that a car is out of service when the rotational system is used, or if the next car in the sequence is not at the bottom terminal when the start signal should be given in the non-rotational system, it is desirable to effect the operation of the start signal of the next car. In order to accomplish this purpose, contact members C8, C9, C10, and C11 are provided, which in the rotational system, are arranged to be connected in shunt circuit relation with contact members C1. For the non-rotational system, these contact members are also employed, together with contact members C4, C5, C6, and C7, to rapidly step the system to the next car in the sequence at either the bottom or top terminal.

It will be observed that sixteen contact members, similar to C4, have been illustrated, in Fig. 1, showing the mechanical construction of the timing contact device, while in Fig. 3, only eight of these contact members have been illustrated, and reference characters applied to them. It will be understood that these contact members are all connected in parallel circuit relation, and that the number used depends upon the speed of response with which it is desired to effect a subsequent operation of a dispatching signal.

In order to operate the contact members C4 through C11, a series of discs 13 is provided, on the shaft 10. Each of the discs 13 is provided in this modification of the invention with five cam surfaces 14, which are arranged to cause the contact members C4 through C11 to be successively engaged and disengaged. It will be observed that the cam surfaces 14 of the discs 13 are staggered, so that contact members C4 through C7 are successively made and broken. In like manner, contact members C8 through C11 are successively made and broken. It will then be understood that between successive engagements of contact members C1 and C2, or C3, contact members C8 through C11, individual to the bottom terminal, are successively closed and opened, while contact members C4 through C7, individual to the top terminal, are successively closed and opened.

Explanation of method of circuit tracing

In order to reduce the complication and confusion entailed in tracing the circuits, only the minimum number of elements will be included in the tracing of any circuit. The circuit for effecting the energization of the pick-up relay PU for the up sequence chain will be traced to illustrate the method whereby the circuits will be traced.

As soon as switches 15 are closed, conductors L1—L2 and L3—L4 are energized. The operating winding of the pick-up relay PU is then energized over a circuit which may be traced as follows:

L3, PU, 1NU6, 2NU6, 3NU6, 4NU3, L4.

This circuit may be read in words as follows: from the energized conductor L3, through the operating winding of the pick-up relay PU, contact members No. 6 of No. 1 next-up relay, contact members No. 6 of No. 2 next-up relay, contact members No. 6 of No. 3 next-up relay, contact members No. 3 of No. 4 next-up relay, to the energized conductor L4.

Detailed description of operation of rotational dispatcher system

Referring now particularly to Fig. 4 of the drawings, it will be observed that there is provided an advance-up light for each car. These are designated as ALU1, ALU2, and ALU3. In like manner, each car is provided with a next-up signal designated as follows: NLU1, NLU2, and NLU3. A start up signal, individual to each car, is also provided, the designation being respectively, SLU1, SLU2, and SLU3.

Each car is also provided with a set of down signals comprising incandescent lights. These signals include an advance down signal, individual to each car, and designated as follows: ALD1, ALD2, and ALD3. Next-down signals are provided, which are identified as follows: NLD1, NLD2, and NLD3. Start-down signals are also provided, which are designated as follows: SLD1, SLD2, and SLD3.

In order to effect the operation of the up signals in each car, a relay chain comprising next-up relays 1NU, 2NU, 3NU, and 4NU, is provided. Relays 1NU, 2NU and 3NU are individual to cars Nos. 1, 2, and 3. Relay 4NU is provided to complete the chain, since for its proper functioning, it is necessary to use an even number of relays. On operation, each of the relays of the chain completes a holding circuit for itself, and also prepares an energizing circuit for the next relay in the chain.

The operation of one of the next-up relays of the relay chain causes the operation of the start signal of the car which is individual to the relay in the chain that has operated. The next-up relay also causes the operation of the next signal in the car which is next to be dispatched, and the advance signal in the car which is to be dispatched after the next car in the sequence has been dispatched.

While the next signal and the advance signal may be given while the cars are moving in the hatchway, it is necessary for the car to which the start signal is to be given, to be at the terminal. For this purpose, start relays 1SU, 2SU, and 3SU, individual respectively, to each car, are provided. The energizing circuits for these relays are completed respectively, through floor segments 1FSB, 2FSB, and 3FSB, when their corresponding brushes, operable in accordance with the movement of the car individual thereto, come into engagement with them.

In order to effect the operation of the down signals in the elevator cars, a relay chain, comprising next-down relays 1ND, 2ND, 3ND, and 4ND, is provided. Each of these relays is operated in accordance with the operation of a corresponding next-up relay of the relay chain which controls the operation of the up signals. The operation of any one of the next-down relays causes the operation of the start down signal of the car individual thereto, the operation of the next-down signal of the next car, and the advance-down signal of the next succeeding car.

The start-down signal for any of the cars will not be given until the operation of a start-down relay ISD, 2SD or 3SD, individual thereto, is operated. The energizing circuits for these start-down relays are, respectively completed through the floor segments IFST, 2FST and 3FST, and brushes individual thereto, which move in accordance with the movement of the elevator cars.

The next-up relays are successively operated by means of chain-driving relays AU and BU. When both of the chain-driving relays are de-energized, the odd-numbered next-up relays may be energized. When both of the chain-driving relays are energized, the even-numbered next-up relays may be energized. The next-up relay that is energized depends upon the next-up relay previously energized.

The chain-driving relays AU and BU are caused to be successively energized, and deenergized, by means of the contact members C1, which it will be recalled, are operated by means of the timer motor TM.

It will be observed that the timer motor TM is provided with a field winding TF, which is connected for energization between conductors L1 and L2, and an armature winding TA, which is connected between a potentiometer P and the conductor L2. It will be understood that the speed of rotation of the armature TA may be varied by adjusting the potentiometer P, as may be desired.

The operation of the timer motor TM also causes the operation of contact members C2 and C3, either of which is arranged to control the dispatching of the cars from the upper terminal. When either the contact members C2, or the contact members C3 are closed, a down impulse relay D is energized. The contact members of the down impulse relay D cooperating with certain of the contact members of the next-up relays, serve to condition circuits for effecting the operation of the relay chain comprising the next-down relays.

The contact members C2 and C3 are rendered effective, depending upon whether a plug 16, Fig. 3, is inserted in the jack 17 or in the jack 18. Thus, when the plug 16 is inserted in the jack 18, cars will be dispatched simultaneously from the top and from the bottom terminals. When the plug 16 is inserted in the jack 17, as illustrated in the drawings, cars will be dispatched alternately from the lower and upper terminals.

In the event that it is desired to take any of the cars out of service, it is desirable to maintain the dispatching system intact for the dispatching of the cars remaining in service. For this purpose, out-of-service relays IY, 2Y, and 3Y are provided, each of which is controlled by its respective switch IYS, 2YS and 3YS. In addition, it is also necessary to cross-connect the next-down relays of the relay chain associated with the top terminal, and for this purpose, plugs A, B, and C are provided. It will be observed that the sleeves of the plugs A, B, and C are illustrated as being connected in series circuit relation with the potentiometer P, while the tips of these plugs are connected to operating windings of certain of the next-down relays. If the desired sequence of dispatching the cars is 1, 2, 3, the plug B, which corresponds to the second car, will be connected to the next-down relay IND associated with No. 1 car; the plug C associated with car No. 3 will be connected to the next-down relay 2ND associated with car No. 2; and plug A, associated with car No. 1, will be connected to next-down relay 3ND, which is associated with the No. 3 car. If any of the cars is out of service, corresponding changes may be made in the plugs A, B, and C, depending upon which car is out of service, in order to maintain the continuity of operation. In order to provide for the proper sequence of operation of the advance up lights ALU1, ALU2, and ALU3, plugs A', B', and C' are provided. These plugs will be properly arranged when any car is taken out of service, so that the proper advance signal will be operated to maintain the desired sequence.

In order to condition the system for operation as a non-rotational dispatcher, a transfer relay T is provided, the operating winding of which is energized when the switch TS is closed. For rotational operation, the switch TS is opened, and the operating winding of the transfer relay T is deenergized. The contact members of the transfer relay T, as illustrated in the drawings, are arranged to complete the proper circuits for operating the system as a rotational dispatcher.

In describing the functioning of the dispatching system as a rotational dispatcher, it will be assumed that the switches 15 are closed, and that the conductors L1—L2 and L3—L4 are energized. It will also be assumed that all of the cars are at the lower terminal, that plug 16 is in jack 17, and that the plugs A, B, C, A', B', and C' are in the positions illustrated in the drawings. As soon as conductors L3 and L4 are energized, the pick-up relay PU is energized over a circuit which may be traced as follows:

L3, PU, 1NU6, 2NU6, 3NU6, 4NU3, L4

The energization of the pick-up relay PU completes a circuit for energizing the operating winding of next-up relay INU,

L3, PU2, INU, L4 and next-up relay INU completes a holding circuit for itself,

L3, AU7, 1NU3, INU, L4

The opening of contact members 1NU6, in response to the operation of the next-up relay INU, opens the energizing circuit for the pick-up relay PU, and it is not energized again during the normal operation of the dispatcher system.

Since car No. 1 is at the bottom terminal, start-up relay ISU is energized,

L3, 1Y5, IFSB, ISU, 1NU7, 3NU7, T16, L4 and start-up relay ISU completes a holding circuit for itself,

L3, 1Y5, IFSB, ISU, ISU3, L4 so that the start-up relay ISU is maintained energized as long as the car individual thereto remains at the terminal.

The operation of the start-up relay ISU completes a circuit for operating the start-up signal for car No. 1,

L3, SLU1, ISU4, L4

Car No. 1 then leaves the lower terminal and at floor segment IFSB, opens the holding circuit for the start-up relay ISU, which drops out and the start-up signal SLU1 is extinguished.

In response to the closing of the next-up relay INU, the next-up signal NLU2 of car No. 2 is energized,

L3, NLU2, 2Y12, T24, INU10, L4

At this time also, the advance-up signal ALU3 of car No. 3 is energized,

L3, ALU3, A', INU9, T18, L4

At this time then it will be understood that car No. 1 either has left or is leaving the bottom terminal, car No. 2 has a signal which indicates that it is the next car to leave, and car No. 3 has the advance signal, which indicates that it is the next succeeding car to leave.

Contact members C1, which are controlled by means of the timer motor TM, are now closed, and chain-driving relay BU is energized,

L3, AU6, T7, C1, T4, AU4, BU, PU1, L4

In response to the energization of chain-driving relay BU, a circuit is completed for energizing the operating winding of the next-up relay 2NU,

L3, BU5, INU4, 2NU, L4

Since contact members C1 are only closed momentarily, the operating winding of chain-driving relay AU, which was shunted by contact members C1, is now energized in series with the operating winding of chain-driving relay BU,

L3, AU, BU3, BU, PU1, L4

A holding circuit is then completed for the operating winding of the next-up relay 2NU,

L3, AU8, 2NU4, 2NU, L4

At contact members AU7, the holding circuit for the next-up relay INU is opened and it is de-energized. Due to the deenergization of next-up relay INU, the next-up signal in car No. 2 and the advance-up signal in car No. 3 are extinguished.

The energization of next-up relay 2NU completes a circuit for energizing the next-up light of car No. 3,

L3, NLU3, 3Y12, T28, 2NU10, L4 and the advance-up light of car No. 1,

L3, ALU1, B', 2NU9, T18, L4

Since car No. 2 is at the bottom terminal, its start-up relay 2SU will now be energized,

L3, 2Y5, 2FSB, 2SU, 2NU7, INU8, T16, L4 and a holding circuit will be provided therefor,

L3, 2Y5, 2FSB, 2SU, 2SU3, L4

The circuit for energizing the start-up signal 2SLU is then completed,

L3, SLU2, 2SU4, L4

Car No. 2 then leaves the bottom terminal, and in leaving, opens the holding circuit previously established for the start-up relay 2SU. As a result, the start-up signal SLU2 is extinguished.

It will now be assumed that car No. 1 has arrived at the top. However, no further action will take place, until contact members C3, which are operated by the timer motor TM, are closed. As soon as contact members C3 are closed, impulse relay D is energized,

L1, D, 16, C3, L2

It will be recalled that the next-up relay 2NU is still energized, and thus, when impulse relay D is energized, a circuit is completed for energizing next-down relay IND,

L1, 2Y3, 2NU3, D4, B, IND, L2

The energization of next-down relay IND completes a holding circuit for itself,

L1, B, C, A, D2, AD7, 2ND2, IND2, IND, L2 a circuit for operating the next-down signal NLD2 of car No. 2,

L1, NLD2, 2Y10, T23, IND3, L2 and at the same time, completes a circuit for energizing the advance-down signal of car No. 3,

L1, ALD3, 3Y8, 2Y8, IND3, T17, L2

At the same time, since car No. 1 is at the top terminal, start-down relay ISD is energized,

L1, IY4, IFST, ISD, IND6, 3ND5, T14, L2

A holding circuit is then completed for start-down relay ISD,

L1, IY4, IFST, ISD, ISD3, L2.

A circuit is then completed for energizing start-down signal SLD1,

L1, SLD1, ISD4, L2.

Car No. 1 then leaves the top terminal, and in so doing, opens the holding circuit for start-down relay ISD. As a result, the energizing circuit for the start-down signal SLD1 is opened, and this signal is extinguished.

At this time, it will be understood that car No. 1 is approaching the bottom terminal, car No. 2 is approaching the top terminal, and car No. 3 is still at the bottom terminal. Car No. 1 has displayed in it the advance-up signal, car No. 2 has the next-down signal, and car No. 3 has the next-up and advance-down signals.

Contact members C1 are again closed by the timer motor TM, and as a result, a shunt circuit is placed around the operating winding of the chain-driving relay BU,

BU, BU3, AU3, T4, C1, T7, AU5, BU and, therefore, this relay drops out. Chain-driving relay BU, in dropping out, completes an energizing circuit for next-up relay 3NU,

L3, BU4, 2NU5, 3NU, L4

The deenergization of chain-driving relay BU also opens contact members BU3 and thereby opens the energizing circuit for the operating winding of chain-driving relay AU. The energizing circuit for the operating winding of chain-driving relay AU is momentarily maintained until contact members C1 are opened,

L3, AU, AU3, T4, C1, T7, AU5, PU1, L4

As soon as contact members C1 are opened, chain-driving relay AU is deenergized, and a holding circuit is completed for next-up relay 3NU,

L3, AU7, 3NU4, 3NU, L4

Chain-driving relay AU, in dropping out, also opens the holding circuit for next-up relay 2NU, and it drops out. Relay 2NU, in dropping out, extinguishes the next-up signal in car No. 2 and the advance-up signal in car No. 3.

The energization of next-up relay 3NU completes a circuit for energizing the next-up signal NLU1 of car No. 1,

L3, NLU1, 1Y12, T20, 3NU10, L4 and at the same time, completes a circuit for energizing the advance-up signal ALU2 of car No. 2,

L3, ALU2, C', 3NU9, T18, L4

Since car No. 3 is at the bottom terminal, a circuit is also completed for energizing the operating winding of start-up relay 3SU,

L3, 3Y5, 3FSB, 3SU, 3NU8, 2NU8, 1NU8, T16, L4

A holding circuit is then completed for relay 3SU,

L3, 3Y5, 3FSB, 3SU, 3SU3, L4

The start-up signal SLU3 of car No. 3 is then energized,

L3, SLU3, 3SU4, L4

Car No. 3 then leaves the bottom terminal, and in so doing, opens the holding circuit for start-up relay 3SU, which is immediately deenergized, and as a result, the start-up signal in car No. 3 is extinguished.

It will now be assumed that car No. 2 has arrived at the top terminal. Car No. 3 is approaching the top terminal and car No. 1 is approaching the bottom terminal. Contact members C3 operated by the timer motor TM are again closed, effecting a second energization of the impulse relay D.

Since next-up relay 3NU is now energized, a circuit is completed for energizing the operating winding of next-down relay 2ND,

L1, 3Y3, 3NU3, D5, C, 2ND, L2

A holding circuit is then established for the next-down relay 2ND, as soon as impulse relay D is deenergized, due to the opening of contact member C3,

L7, B, C, A, D2, T11, 3ND2, 2ND3, 2ND, L2

It will be observed that the holding circuit for next-down relay 1ND is opened on the operation of next-down relay 2ND and, therefore, next-down relay 1ND drops out, extinguishing the next-down signal in car No. 2, and the advance-down signal in car No. 3.

The energization of next-down relay 2ND also completes a circuit for energizing the next-down signal of car No. 3,

L1, NLD3, 3Y10, T27, 2ND9, L2 and the advance-down signal of car No. 1,

L1, ALD1, 1Y6, 3Y6, 2ND8, T17, L2

A further result of the energization of next-down relay 2ND is to effect the energization of start-down relay 2SD,

L1, 2Y4, 2FST, 2SD, 2ND6, 1ND7, T14, L2

A holding circuit is immediately completed for start-down relay 2SD,

L1, 2Y4, 2FST, 2SD, 2SD3, L2

The start-down signal SLD2 of car No. 2 is then energized,

L1, SLD2, 2SD4, L2 and car No. 2 then leaves the top terminal. In leaving the top terminal, the holding circuit for start-down relay 2SD is opened; it is deenergized, and the start-down signal in car No. 2 is extinguished.

Contact members C1 operated by the timer motor TM, are again closed, and cause the successive energization of chain-driving relays BU and AU, as has been described hereinbefore. In response to the energization of chain-driving relay BU, next-up relay 4NU is energized.

L3, BU5, 3NU5, 4NU, L4

The energization of chain-driving relay AU opens the holding circuit for next-up relay 3NU, which drops out, and completes a holding circuit for next-up relay 4NU,

L3, AU8, 4NU2, 4NU, L4

It will now be observed that, in order to effect the energization of next-up relay 1NU, it is necessary that both chain-driving relays AU and BU be deenergized. It will also be observed that, in order to effect the energization of next-up relay 2NU, the chain-driving relays AU and BU both must be energized. Thus, the chain-driving relays AU and BU must both be deenergized when an odd-numbered next-up relay is to be energized, and both of the chain-driving relays AU and BU must be energized for effecting the energization of an even-numbered next-up relay. It will then be understood that an even number of next-up relays must be used in order to effect the proper functioning of the relay chain. If only three elevator cars are used, it is still necessary to supply a fourth next-up relay to complete the chain. If four elevators are used, the next-up relay 4NU may be made individual to the fourth elevator car.

It is desirable, however, in view of the fact that only three elevators are used, to rapidly step by the signal which would normally be given to the fourth elevator car, that is, at the time that the next-up relay 4NU is operated, it is in fact, desirable that the next-up relay 1NU be immediately operated, in order to maintain the proper spacing between the elevator cars which are in service.

It is for this purpose that auxiliary contact members C8, C9, C10, and C11 are provided in the rotational dispatcher system. It will be observed that these contact members are connected in shunt circuit relation with main contact members C1 when all of the next-up relays 1NU, 2NU and 3NU are in the deenergized position. Since this shunt circuit is rapidly being completed and broken by the auxiliary contact members, some one of them will be effective immediately after next-up relay 3NU is deenergized to effect the same operation of the chain-driving relays AU and BU that would normally be effected by the main contact members C1 when the next succeeding start signal would normally be given.

In this instance, the operating winding of the chain-driving relay BU is shunted down, BU, BU3, AU3, T3, 1NU2, 2NU2, 3NU2, C8 for example, AU5, BU Chain-driving relay BU will then be shunted down, and as soon as the contact members C8 are opened, the holding circuit for the operating winding of the chain-driving relay AU is opened, and it is deenergized.

As a result of the deenergization of chain-driving relay BU, a circuit is completed for again effecting the energization of next-up relay 1NU,

L3, BU4, 4NU1, 1NU, L4

The deenergization of chain-driving relay AU opens the holding circuit for next-up relay 4NU and completes the holding circuit for next-up relay 1NU,

L3, AU7, 1NU3, 1NU, L4

Next-up relay 1NU being energized, circuits are completed, which have previously been described, for energizing the next-up signal in car No. 2, and the advance-up signal in car No. 3. As soon as car No. 1 arrives at the bottom terminal, its start-up relay 1SU is energized, and its start-up signal is illuminated. Car No. 1 then leaves the bottom terminal.

Contact members C3 operated by the timer motor TM, again close, completing the circuit for energizing the operating winding of the down impulse relay D. Since next-up relay 1NU is now energized, a circuit is completed for energizing next-down relay 3ND,

L1, 1Y3, 1NU5, D6, A, 3ND, L2

As soon as the down impulse relay D is de-energized, due to the opening of contact members C3, a holding circuit is completed for next-down relay 3ND,

L1, B, C, A, D2, AD7, 4ND2, 3ND3, 3ND, L2

The energization of next-down relay 3ND opens the holding circuit for next-down relay 2ND, and as a result, the next-down signal in car No. 3 and the advance-down signal in car No. 1, are extinguished.

A further result of the energization of next-down relay 3ND is to complete a circuit for energizing the next-down signal NLD1 of car No. 1,

L1, NLD1, 1Y10, T19, 3ND9, L2 and to energize the advance-down signal ALD2 of car No. 2,

L1, ALD2, 2Y6, 1Y8, 3ND8, T17, L2

Car No. 3 now being at the top terminal, start-down relay 3SD is energized,

L1, 3Y4, 3FST, 3SD, 3ND7, 2ND7, 1ND7, T14, L2

A holding circuit is completed for the start-down relay 3SD,

L1, 3Y4, 3FST, 3SD, 3SD3, L2

The start-down signal SLD3 is then operated,

L1, SLD3, 3SD4, L2

Car No. 3 then starts down, opening the holding circuit for the start-down relay 3SD, which is then deenergized and, as a result, the start-down signal SLD3 is extinguished.

The cars will then continue to arrive and depart from the bottom and the top terminals in the order indicated, and the dispatching signals will be operated, as has been set forth hereinbefore, in repeated order.

Assuming now that car No. 2 is taken out of service, it is still desirable to operate car Nos. 1 and 3 under the control of the rotational dispatcher. Therefore, the switch 2YS is closed, and out-of-service relay 2Y is energized,

L3, 2Y, 2YS, L4

Also, plugs B and B' are removed from their respective jacks. Plug C is positioned in the jack from which plug B was withdrawn, and in like manner, plug C' is placed in the jack from which plug B' was withdrawn.

In view of the fact that out-of-service relay 2Y is now energized, a circuit will be completed for shunting contact members C1 as soon as the time in the sequence is reached when normally the start signal would be given to car No. 2. One of the auxiliary contact members C8, C9, C10 or C11 will be effective to shunt the contact members C1 at this time, and will immediately effect the deenergization of chain-driving relays AU and BU to quickly deenergize next-up relay 2NU and to energize next-up relay 3NU.

It will then be understood that the start-signals to car Nos. 1 and 3 will be given in such relationship that these cars may be dispatched at uniform intervals from the bottom and the top floors. It will, of course, be obvious that it is hardly practical to employ a dispatcher system for controlling the operation of only two cars. However, when a large bank of elevators comprising six to eight cars is employed, and one or more of them is taken out of service, it is highly desirable that the remaining cars be still under the control of the dispatcher. It will, therefore, be understood that the remaining cars in service will continue to be dispatched from the bottom and the top terminals at uniformly spaced intervals, the length of time depending upon the setting of the potentiometer P, which may be altered to change the speed of the timer motor TM to obtain the proper period between dispatching signals.

In the event that it is desired to dispatch a car from the top terminal at the same time that a car is dispatched from the bottom terminal, the plug 16 may be inserted in the jack 18. Since contact members C2 are closed at the same time that contact members C1 are closed, it will be obvious that dispatching signals will be given to a car at the bottom terminal, and a car at the top terminal at the same time.

It will be observed that the impulse relay D is provided with contact members D2 and D3, which are connected in parallel circuit relation with each other. It will also be observed that the contact members D3 are provided with a time-delay attachment, such as a dashpot 19. Because of the presence of the time-delay in the operation of the contact members D3, these contact members will remain open some time after the contact members D2 are opened when the impulse relay D is operated. In like manner, contact members D3 will remain closed after the impulse relay D is deenergized for a time which is sufficiently long to permit the contact members D2 to be closed.

This arrangement of contact members is provided in order to open the holding circuit to any of the next-down relays 1ND, 2ND, 3ND or 4ND, when any one of them is not operable due to the car individual thereto being out of service. It will be recalled that, under normal operation, when all of the cars are in service, the holding circuit of the preceding next-down relay is opened on the operation of the next succeeding next-down relay. If a car is out of service, the next-down relay, individual thereto, is not energized, and, therefore, it is necessary to provide some means for opening the holding circuit of the previously energized next-down relay, such as that illustrated and described herein.

*Detailed description of non-rotational dispatcher system*

In order to condition the herein-described dispatcher system to operate as a non-rotational dispatcher, it is only necessary to remove the plugs A, B and C and A', B', and C', and to operate the transfer switch TS to effect the energization of the transfer relay T,

L1, T, TS, L2

The operation of the transfer relay T separates the equipment which is individual to the top terminal from that which is individual to the bottom terminal. Such a separation of equipment is desired, in view of the fact that under the control of the non-rotational dispatcher system, the cars leave either terminal in the order in which they arrive at either terminal. Therefore, there is no correlation in the departure of any particular cars from either terminal, but rather some car is dispatched from either terminal at predetermined intervals.

In view of the fact that the cars leave the terminals in the order in which they arrive at the terminals, the advance-down and advance-up lights in the cars are not used in this system. If they were used, a false indication would usually be given, since it is impossible to provide advance signals to the cars in view of their non-rotational operation.

An up impulse relay U is provided which is operable under the control of contact members C1 to control the functioning of the start-up relays. A pick-up relay PD associated with the apparatus corresponding to the top terminal is provided for initiating the functioning of the relay chain individual thereto.

Since the apparatus associated with the top terminal is separate and distinct from that associated with the bottom terminal, it is necessary to provide chain-driving relays AD and BD, corresponding to chain-driving relays AU and BU for effecting the sequential operation of the relay chain comprising the next-down relays 1ND, 2ND, 3ND and 4ND. The functioning of the chain-driving relays AD and BD is controlled by means of the auxiliary contact members C4, C5, C6, and C7 in the manner set forth hereinbefore. It will be recalled that these contact members are operated rapidly and successively by means of the timer motor TM, which also operates contact members C1, C2, and C3, and auxiliary contact members C8, C9, C10, and C11.

As has been set forth hereinbefore, the cars under the control of the non-rotational system normally have start signals given to them in a predetermined order, which is identical with that which is provided in the rotational system, that is, there is a fixed schedule on which the cars would normally operate provided they arrive at the terminals in the order of the sequence. However, if a car gets ahead of schedule, and arrives at a terminal ahead of another car in the schedule, it will be the first car that will leave that terminal. It is, therefore, necessary to provide for rapidly stepping the dispatcher to by-pass the equipment which would normally give the start signal to the next car in the sequence, and apply it to the next car in the sequence, which is located at the terminal.

At the bottom terminal, a stepping relay CU is provided for applying the start signal to the next car in the sequence, which is at the bottom terminal. The stepping relay CU operates when the elevator cars are at the bottom terminal, and is energized over circuits including floor segments 1FSB', 2FSB', and 3FSB', and the associated brushes, which are movable in accordance with the cars individual thereto.

In like manner, if a car is at the top terminal, a stepping relay CD is provided, for applying the start signal to the next car in the sequence which is at the top terminal. The stepping relay CD may be energized through floor segments 1FST', 2FST' and 3FST', in conjunction with the brushes which are movable with the cars individual thereto.

In the event that no car is at either the bottom or the top terminal when a start signal should ordinarily be given, it is desirable to store this signal, so that a car may be dispatched from either terminal as soon as a car arrives at either terminal. For this purpose, signal-storing relays, RU at the bottom terminal, and, RD at the top terminal, are provided. These relays are arranged to be energized only when no car is at the terminal individual thereto at a time when a start signal should be given, and are effective to provide a start signal for the first car arriving at either terminal.

In describing the functioning of the system under the control of the non-rotational dispatcher, it will be assumed that switches 15 are closed, that conductors L1—L2 and L3—L4 are energized, that the plug 16 is in jack 17, that the plugs A, B, C, A', B', and C' have been removed from their respective jacks, and that all of the cars are located at the bottom terminal. As soon as conductors L1 and L2 are energized, the timer motor TM begins to operate to effect the operation of the contact members C1 through C11 in the manner set forth hereinbefore. Pick-up relay PU will be energized,

L3, PU, 1NU6, 2NU6, 3NU6, 4NU6, L4 to start the functioning of the relay chain comprising relays 1NU, 2NU, 3NU and 4NU. In order to start the functioning of the relay chain comprising relays 1ND, 2ND, 3ND and 4ND, the pick-up relay PD is energized,

L1, PD, T12, 1ND5, 2ND5, 3ND5, 4ND4, L2

At the bottom terminal, relay 1NU is energized,

L3, PU2, 1NU, L4 and it immediately opens the energizing circuit for the pick-up relay PU and completes a holding circuit for itself,

L3, AU7, 1NU3, 1NU, L4

The next-up signal NLU1 for car No. 1 is then energized,

L3, NLU1, 1Y12, T22, 1NU10, L4

The operator is thus informed that car No. 1 is the next car to leave the bottom terminal.

Since car No. 1 is at the bottom terminal, a circuit is completed for energizing the stepping relay CU,

L3, T1', 1NU1, 1SU1, 1FSB', CU, AU2, BU2, L4

It will now be assumed that contact members C1 are closed, and as a result, impulse relay U is energized,

L3, T5, C1, T9, U, L4

The impulse relay U is maintained energized only as long as contact members C1 are closed. As soon as they are opened, it drops out. Start relay 1SU is energized by the energization of impulse relay U,

L3, 1Y5, 1FSB, 1SU, 1NU7, 3NU7, T15, CU2, U2, L4

The start signal SLU1, for car No. 1, is then energized,

L3, SLU1, 1SU4, L4 and car No. 1 may then leave the floor.

A further result of the energization of the start up relay 1SU is to open the energizing circuit for the stepping relay CU and it is immediately deenergized.

As soon as the stepping relay CU is deenergized, one of the contact members C8, C9, C10 or C11 completes a circuit for energizing chain-driving relay BU, L3, AU6, C8 for example, T6, CU1, AU4, BU, PU1, L4

As soon as the contact members C8 are opened, the operating winding of the other chain-driving relay AU is energized in series with the operating winding of chain-driving relay BU,

L3, AU, BU3, BU, PU1, L4

The energization of chain-driving relay BU completes an energizing circuit for the next up relay 2NU of the relay chain,

L3, BU5, 1NU4, 2NU, L4 and a holding circuit therefor is immediately completed,

L3, AU8, 2NU4, 2NU as soon as the chain-driving relay AU is energized. At the same time, the holding circuit for the next up relay 1NU is opened at contact members AU7 on the energization of chain-driving relay AU.

The energization of next-up relay 2NU completes a circuit for energizing the next up signal NLU2 of car No. 2,

L3, NLU2, 2Y12, T26, 2NU10, L4

The operator in car No. 2 is then informed that his car is the next one to leave the bottom terminal.

It will now be assumed that car No. 1 leaves the bottom terminal. Therefore, at floor segment 1FSB the holding circuit for the start up relay 1SU is opened and the start up signal SLU1 in car No. 1 is extinguished.

Since car No. 2 is at the bottom terminal, a circuit is completed as a result of the energization of next-up relay 2NU for again effecting the energization of stepping relay CU,

L3, T1′, 2NU1, 2SU1, 2FSB′, CU, AU1, BU1, L4

While the foregoing sequence of operation has been taking place at the lower terminal, a similar sequence has been taking place at the upper terminal. However, in view of the fact that no car is at the upper terminal, no start down signals are given.

In response to the energization of pick-up relay PD,

L1, PD, T12, 1ND5, 2ND5, 3ND5, 4ND4, L2 a circuit is completed for effecting the energization of next-down relay 1ND in the relay chain,

L1, T8, PD2, 1ND, L2

A holding circuit is immediately completed for relay 1ND,

L1, T8, D2, AD7, 2ND2, 1ND2, 1ND, L2

The energization of next-down relay 1ND opens the energizing circuit for pick-up relay PD and it is deenergized.

It will be assumed that contact members C4 are next closed, and as a result, the chain-driving relay BD is energized.

L1, AD6, C4, CD1, AD4, BD, PD1, T2, L2

As soon as contact members C4 are opened, the other chain-driving relay AD is energized in series with chain-driving relay BD,

L1, AD, BD3, BD, PD1, T2, L2

The energization of chain-driving relay BD completes a circuit for effecting the energization of next-down relay 2ND in the relay chain,

L1, T8, T10, BD5, 1ND3, 2ND, L2

The previously traced holding circuit for next-down relay 1ND is then opened, and it is deenergized. As soon as chain-driving relay AD is energized, a holding circuit is completed for next-down relay 2ND,

L1, T8, D2, AD8, 3ND2, 2ND3, 2ND, L2

Contact members C5 are now closed and complete a circuit for shunting down the operating winding of chain-driving relay BD,

BD, BD3, AD3, CD1, C5, AD5, BD

The deenergization of chain-driving relay BD completes an energizing circuit for next-down relay 3ND,

L1, T8, T10, BD4, 2ND4, 3ND, L2

The energization of next-down relay 3ND opens the previously traced holding circuit for next-down relay 2ND, and it is deenergized.

As soon as contact members C5 are opened, the energizing circuit for chain-driving relay AD is broken and it is deenergized. A holding circuit is then completed for next-down relay 3ND,

L1, T8, D2, AD7, 4ND2, 3ND3, 3ND, L2

Contact members C6 are now closed and complete a circuit for energizing the chain-driving relay BD, which has previously been traced. As soon as contact members C6 are opened, the operating winding of chain-driving relay AD is energized in series circuit relation with the operating winding of the chain-driving relay BD. In response to the energization of relay BD, a circuit is completed for energizing next-down relay 4ND of the relay chain,

L1, T8, T10, BD5, 3ND4, 4ND, L2

Energization of next-down relay 4ND opens the previously traced holding circuit for next-down relay 3ND, and it is deenergized. As soon as chain-driving relay AD is energized, a holding circuit is completed for next-down relay 4ND,

L1, T8, D2, AD8, 1ND4, 4ND3, 4ND, L2

Contact members C7 are now closed and complete a circuit, which has previously been traced, for shunting down chain-driving relay BD. As soon as contact members C7 are opened, the energizing circuit for chain-driving relay AD is opened, and it is deenergized. In response to the deenergization of chain-driving relay BD, a circuit is completed for again energizing next-down relay 1ND,

L1, T8, T10, BD4, 4ND1, 1ND, L2

The holding circuit for next-down relay 4ND is then opened and it is deenergized.

It will be observed that the successive deenergization and energization of chain-driving relays AD and BD causes a sequential operation of the relays 1ND, 2ND, 3ND and 4ND in the relay chain. As long as no car arrives at the top terminal, the relays in the relay chain will continue to be operated in this sequence. The next-down lights of the cars individual thereto will momentarily be flashed, but this signal will be meaningless to an operator.

Main contact members C3 are now closed, and it will be assumed that car No. 1, as yet, has not arrived at the top terminal. Impulse relay D is then energized,

L1, D, 16, C3, L2

In response to the energization of impulse relay D, a circuit is completed for energizing the stepping relay CD,

L1, D1, CD, AD2, BD2, L2

Since no car is at the top terminal, the stepping relay CD is deenergized as soon as contact members D1 are opened, which occurs as soon as contact members C3 are opened and the operating winding of the impulse relay D is deenergized.

A further result of the energization of the impulse relay D is to complete a circuit for effecting the energization of signal storing relay RD,

L1, RD, 1SD2, 2SD2, 3SD2, D7, L2

As soon as the signal storing relay RD is energized, contact members RD1 are closed to shunt the contact members D7, thereby providing a holding circuit for the signal storing relay RD, which can only be interrupted when a car arrives at the top terminal.

It will now be assumed that car No. 1 arrives at the top terminal. As a result, a circuit is completed for energizing the stepping relay CD,

L1, T1, 1ND1, 1SD1, 1FST', CD, AD2, BD2, L2

Also a circuit is completed for effecting the energization of start-down relay 1SD,

L1, 1Y4, 1FST, 1SD, 1ND6,
3ND6, T13, CD2, RD1, L2

A holding circuit for start-down relay 1SD is completed,

L1, 1Y4, 1FST, 1SD, 1SD3, L2

The start-down signal SLD1 of car No. 1 is then energized,

L1, SLD1, 1SD4, L2 and car No. 1 may then leave the top terminal.

A further result of the energization of start-down relay 1SD is to open the energizing circuits for the signal storing relay RD and the stepping relay CD. These relays are then deenergized.

It will now be assumed that main contact members C1 are again closed. The previously traced circuit for energizing the operating winding of the impulse relay U is again completed, and it, on energizing, completes a circuit for energizing the start-up relay 2SU,

L3, 2Y5, 2FSB, 2SU, 2NU7,
1NU8, T15, CU2, U2, L4

A holding circuit for the start-up relay 2SU is completed,

L3, 2Y5, 2FSB, 2SU, 2SU3, L4

The start-up signal SLU2 for car No. 2 is then energized,

L3, SLU2, 2SU4, L4 and car No. 2 may then leave the bottom terminal.

As a further result of the energization of start-up relay 2SU, the energizing circuit for the stepping relay CU is opened and it is deenergized.

Contact members C8 are now closed to complete a circuit for shunting down the chain-driving relay BU,

BU, BU3, AU3, CU1, T6, C8, AU5, BU

As soon as contact members C8 are opened, the energizing circuit for chain-driving relay AU is opened, and it is deenergized. In response to the deenergization of chain-driving relay BU, a circuit is completed for effecting the energization of next-up relay 3NU in the relay chain,

L3, BU4, 2NU5, 3NU, L4

As soon as the chain-driving relay AU is deenergized, the holding circuit for next-up relay 2NU is opened, and a holding circuit for next-up relay 3NU is completed,

L3, AU7, 3NU4, 3NU, L4

The energization of next-up relay 3NU completes a circuit for energizing the next-up signal NLU3 of car No. 3,

L3, NLU3, 3Y12, T30, 3NU10, L4

A further result of the energization of the next-up relay 3NU is to complete a circuit for energizing the stepping relay CU,

L3, T1', 3NU1, 3SU1, 3FSB', CU, AU2, BU2, L4

It will now be assumed that car No. 1 leaves the top terminal. As a result, the holding circuit for the start-down relay 1SD is opened, and it is deenergized. The start-down signal SLD1 in car No. 1 is then extinguished.

It will also be assumed, at this time, that car No. 2 leaves the bottom terminal. The holding circuit for the start-up relay 2SU is then opened, and it is deenergized. As a result, the start-up signal SLU2 is extinguished in car No. 2.

At the top terminal, shortly after the main contact members C1 had closed, the auxiliary contact members C4 are again closed to effect the energization of chain-driving relays AD and BD for energizing the next-down relay 2ND, and deenergizing the previously energized next-down relay 1ND in the manner described hereinbefore. Contact members C5 are then closed to effect the deenergization of chain-driving relays BD and AD and to energize next-down relay 3ND and deenergize next-down relay 2ND. Contact members C6 are closed to again energize chain-driving relays BD and AD, thereby effecting the energization of next-down relay 4ND and the deenergization of next-down relay 3ND. Contact members C7 are then closed to effect the deenergization of the chain-driving relays BD and AD and the subsequent energization of next-down relay 1ND and the deenergization of next-down relay 4ND.

At the bottom terminal, contact members C1 are again closed, and the impulse relay U is energized. A circuit is then completed for effecting the energization of the start-up relay 3SU.

L3, 3Y5, 3FSB, 3SU, 3NU8,
2NU8, 1NU8, T15, CU2, U2, L4

A holding circuit for the start-up relay 3SU is completed,

L3, 3Y5, 3FSB, 3SU, 3SU3, L4

The start signal SLU3 is then operated for car No. 3,

L3, SLU3, 3SU4, L4 and it is assumed that car No. 3 immediately leaves the bottom terminal.

Contact members C3 at the top terminal are now closed, and impulse relay D is energized. Since no car is at the top terminal, the signal storing relay RD is again energized and holds itself in.

It will now be assumed that car No. 3, due to traffic conditions or for some other reason, reaches the top terminal before car No. 2 arrives at the top terminal. It will be recalled that in the normal sequence, car No. 2 should next be dispatched from the top terminal. However, since car No. 3 is already in the top terminal, it will be the next car to be dispatched.

Contact members C4 will be closed and opened to effect the energization of chain-driving relays BD and AD. In response thereto, next-down relay 2ND is energized, and next-down relay 1ND is deenergized.

In view of the fact that car No. 2 is not at the top terminal, the stepping relay CD is only momentarily energized on the operation of the impulse relay D. Since the stepping relay CD is deenergized, the relay chain will be immediately stepped to effect the energization of the next-down relay 3ND on the closure of auxiliary contact members C5. This is effected by the deenergization of the chain-driving relays BD and AD, which effect the energization of next-down relay 3ND, and the deenergization of the next-down relay 2ND.

It will be observed that the only time interval required for initiating the application of the start-down signal to car No. 3 is that which is required to step the relay chain from next-down relay 2ND to next-down relay 3ND. Since the auxiliary contact members are opened and closed in rapid succession, this time interval is relatively negligible.

Next-down relay 3ND now being energized, a circuit is completed for energizing stepping relay CD,

L1, T1, 3ND1, 3SD1, 3FST', CD, AD2, BD2, L2

A further result of the energization of next-down relay 3ND is to complete a circuit for energizing the next-down signal NLD3 of car No. 3,

L1, NLD3, 3Y10, T29, 3ND9, L2

The operator in car No. 3 is informed that his car is the next one to leave the top terminal and almost immediately, the start signal is given to the operator in this car. Start-down relay 3SD is energized,

L1, 3Y4, 3FST, 3SD, 3ND7, 2ND7,
1ND7, T13, CD2, RD1, L2

A holding circuit for relay 3SD is completed

L1, 3Y4, 3FST, 3SD, 3SD3, L2

The start-down signal SLD3 of car No. 3, is then energized,

L1, SLD3, 3SD4, L2

The energization of start-down relay 3SD opens the energizing circuit for the operating winding of the signal storing relay RD and it is deenergized. Car No. 3, in leaving the terminal, causes the holding circuit for the start-down relay 3SD to be opened, and it is deenergized. A start-down signal SLD3 is then extinguished.

It will then be observed that if the car next in the schedule is not at a terminal when its start signal would normally be given, the relay chain will be stepped around until its position corresponds to that of the next car in the schedule which is at a terminal. This car will then receive the next-start signal and the start signal. If a car is not at a terminal when a start signal would normally be given, the signal is stored and the first car arriving at the terminal is given the start signal immediately.

Since certain further changes may be made in the foregoing construction, and different embodiments of the invention may be made, without departing from the scope thereof, it is intended that all matter shown in the accompanying drawings, and contained in the above description, shall be interpreted as illustrative, and not in a limiting sense.

We claim as our invention:

1. In a system for providing dispatching signals for elevator cars, in combination, a start signal for each car, relay means individual to each start signal and disposed to effect the operation thereof, contact means disposed on each operation to successively effect the operation of said relay means to operate said start signals in a predetermined sequence regardless of the sequence of operation of said cars, driving means for periodically effecting the operation of said contact means, and circuit means interconnecting said signals and relay and contact means.

2. In a system for providing scheduling and dispatching signals for cars operable in a predetermined sequence, in combination, a start signal and a next signal for each car, relay means individual to each car and disposed to operate the start signal of its car and the next signal of the succeeding car in the sequence, contact means disposed on each operation to sequentially operate said relay means, driving means for periodically effecting the functioning of said contact means, and circuit means interconnecting said signals and relay and contact means.

3. In a system for providing scheduling and dispatching signals for cars in a predetermined sequence, in combination, a start signal, a next signal and an advance signal for each car, relay means individual to each car and disposed to operate the start signal of its car, the next signal of the succeeding car in the sequence and the advance signal of the next succeeding car in the sequence, contact means disposed on each operation to sequentially operate said relay means, driving means for periodically effecting the functioning of said contact means, and circuit means interconnecting said signals and relay and contact means.

4. In a system for providing dispatching signals for elevator cars, in combination, a start signal for each car, relay means individual to each start signal and disposed to effect the operation thereof, contact means disposed on each operation to successively effect the operation of said relay means to operate said start signals in a predetermined sequence, driving means for periodically effecting the operation of said contact means, means for removing the signal system of any of the cars from service, and means for effecting the operation of the relay means individual to the next car in the sequence substantially immediately after the relay means individual to a car out of service is operated.

5. In a system for providing dispatching signals for elevator cars operable from a terminal, in combination, a start signal for each car, relay means individual to each start signal and disposed to effect the operation thereof only when its car is at the terminal, main contact means disposed on each operation to successively effect the operation of said relay means to operate said start signals in a predetermined sequence, driving means for periodically effecting the operation of said contact means, means for removing the signal system of any of the cars from service, auxiliary contact means disposed to shunt said main contact means substantially immediately after said main contact means effect the operation of the relay means individual to the car out of service to effect the operation of the relay means of the next car in the sequence, and circuit means interconnecting said signals and relay and contact means.

6. In a system for providing dispatching signals for elevator cars operable between terminals in a hatchway, in combination, a start up signal and a start down signal for each car, an up relay individual to each start up signal and disposed to effect the operation thereof, a down relay individual to each start down signal and disposed to effect the operation thereof, main contact means disposed on each operation to successively effect the operation of the up relays for operating said start up signals in a predetermined sequence, circuit closing means operated by each up relay for conditioning an energizing circuit for a corresponding down relay, secondary contact means disposed on each operation to successively complete the energizing circuits conditioned by said up relays for operating said start down signals in said sequence, driving means for periodically effecting the functioning of said main and secondary contact means, and circuit means interconnecting said signals and relays and contact means.

7. In a system for providing scheduling and dispatching signals for cars operable in a predetermined sequence between terminals in a hatchway, in combination, a start up, a start down, a next up and a next down signal for each car, an up relay individual to each car and disposed to operate the start up signal of its car and the next up signal of the succeeding car in the sequence, a down relay individual to each car and disposed to operate the start down signal of its car and the next down signal of the succeeding car in the sequence, main contact means disposed on each operation to successively effect the operation of the up relays in said sequence, circuit closing means operated by each up relay for conditioning an energizing circuit for a corresponding down relay, secondary contact means disposed on each operation to successively complete the energizing circuits conditioned by said up relays for operating said down relays in said sequence, driving means for periodically effecting the functioning of said main and secondary contact means, and circuit means interconnecting said signals and relays and contact means.

8. In a system for providing scheduling and dispatching signals for cars operable in a predetermined sequence between terminals in a hatchway, in combination, a start up, a start down, a next up, a next down, an advance up and an advance down signal for each car, an up relay individual to each car and disposed to operate the start up signal of its car, the next up signal of the succeeding car in the sequence and the advance up signal of the next succeeding car in the sequence, a down relay individual to each car and disposed to operate the start down signal of its car, the next down signal of the succeeding car in the sequence and the advance down signal of the next succeeding car in the sequence, main contact means disposed on each operation to successively effect the operation of the up relays in said sequence, circuit closing means operated by each up relay for conditioning an energizing circuit for a corresponding down relay, secondary contact means disposed on each operation to successively complete the energizing circuits conditioned by said up relays for operating said down relays in said sequence, driving means for periodically effecting the functioning of said main and secondary contact means, and circuit means interconnecting said signals and relay and contact means.

9. In a system for providing dispatching signals for elevator cars operable between terminals in a hatchway, in combination, a start up signal and a start down signal for each car, an up relay individual to each start up signal and disposed to effect the operation thereof, a down relay individual to each start down signal and disposed to effect the operation thereof, main contact means disposed on each operation to successively effect the operation of the up relays for operating said start up signals in a predetermined sequence, circuit closing means operated by each up relay for conditioning an energizing circuit for a corresponding down relay, secondary contact means disposed on each operation to successively complete the energizing circuits conditioned by said up relays for operating said start down signals in said sequence, driving means for periodically effecting the functioning of said main and secondary contact means, means for removing any of the cars from service, means for effecting the operation of the up relay individual to the next car in the sequence substantially immediately after the up relay individual to the car out of service is operated, and circuit means interconnecting said signals and relay and contact means.

10. In a system for providing dispatching signals for a plurality of elevator cars, a start signal for each of said cars; a relay ring for controlling said start signals, said relay ring comprising a relay for each of said start signals, a plurality of individual energizing connections for said relays, each of said energizing connections being controlled by another of said relays, common energizing circuit means for said individual connections, holding means effective upon operation of each of said relays for maintaining it in operated condition irrespective of the condition of energization of its associated individual energizing connection; and control means for effecting repeated permutational operation of said relays, said control means comprising means effective to open and close said common energizing circuit means and means to selectively render said holding means ineffective.

11. In a system for providing dispatching signals for a plurality of elevator cars, start signals for each of said cars; a relay ring for controlling said start signals, said relay ring comprising a plurality of relays each having contact members and an operating coil, individual energizing connections for said relays, each of said individual connections including the coil of the associated relay and contact members of another of said relays, common energizing circuit means for said individual connections, holding circuits for each of said relays, each of said holding circuits being effective upon operation of the corresponding relay to maintain it in operated condition irrespective of the condition of energization of its associated individual connection; and control means for effecting repeated permutational operation of said relays, said control means comprising means effective to repeatedly open and close said common energizing circuit means and means to selectively interrupt said holding circuits.

12. In a system for providing dispatching signals for a plurality of elevator cars, start signals for each of said cars; a relay ring for controlling said start signals, said relay ring comprising a plurality of relays each having contact members and an operating coil, individual energizing connections for said relays, each of said individual connections including the coil of the associated relay and contact members of another of said relays, a plurality of common energizing circuits for groups of said relays, holding means effective upon operation of each of said relays for maintaining it in operated condition irrespective of the condition of energization of its associated individual connection; and means including a plurality of driving relays for repeatedly opening and closing said common energizing circuits and for selectively rendering said holding means ineffective.

13. In a system for providing dispatching signals for a plurality of elevator cars, start signals for each of said cars; a relay ring for controlling said start signals, said relay ring comprising a plurality of relays each having contact members and an operating coil, individual energizing connections for said relays, each of said individual connections including the coil of the associated relay and contact members of another of said relays, a plurality of common energizing circuits for groups of said relays, holding circuits for each of said relays, each of said holding circuits being effective upon operation of the corresponding relay to maintain it in operated condition irrespective of the condition of energization of its associated individual connection; and means including a plurality of driving relays for repeatedly opening and closing said common energizing circuits and for selectively interrupting said holding circuits.

14. In a system for providing dispatching signals for a plurality of elevator cars, a start signal for each of said cars; a car-position responsive element for each of said cars; a timing device having timing contact means operated repeatedly under time control; a relay ring for controlling said start signals, said relay ring comprising a relay for each of said start signals, and energizing and holding means therefor effective upon each operation of said timing contact means to cause operation in sequence of each of said relays to a predetermined circuit-controlling condition and to cause the remainder of said relays to maintain a different circuit-controlling condition; and means for rendering said start signals effective when the corresponding car is in position to start and the corresponding relay is in said predetermined circuit-controlling condition.

15. In a system for providing dispatching signals for a plurality of elevator cars, a start signal for each of said cars, a next signal for each of said cars, a car-position responsive element for each of said cars; a timing device having timing contact means operated repeatedly under time control; a relay ring for controlling said start signals, said relay ring comprising a relay for each of said start signals, and energizing and holding means therefor effective upon each operation of said timing contact means to cause operation in sequence of each of said relays to a predetermined circuit-controlling condition and to cause the remainder of said relays to maintain a different circuit-controlling condition; means responsive to operation of any of said relays to said predetermined circuit-controlling condition for rendering effective the next signal for the car corresponding to the next succeeding relay in said sequence; and means for rendering said start signals effective when the associated car is in position to start and the corresponding relay is in said predetermined circuit-controlling condition.

16. In a system for providing dispatching signals for a plurality of elevator cars operable between a first terminal and a second terminal; a first-terminal start signal for each of said cars; a timing device having timing contact means operated repeatedly under time control; a relay ring for controlling said first-terminal start signals, said relay ring comprising a first-terminal relay for each of said first-terminal start signals, and energizing and holding means therefor effective upon operation of said timing contact means to cause operation in sequence of each of said first-terminal relays to a predetermined circuit-controlling condition and to cause the remainder of said first-terminal relays to maintain a different circuit-controlling condition; a second-terminal start signal for each of said cars; a second terminal relay for each of said second-terminal start signals; and means responsive to operation of any of said first-terminal relays to said predetermined circuit-controlling condition for causing operation of the corresponding second-terminal relay.

17. In a system for providing dispatching signals for a plurality of elevator cars operable between a first terminal and a second terminal; a first-terminal start signal for each of said cars; a timing device having timing contact means operated repeatedly at a predetermined time interval and having auxiliary contact means operated repeatedly substantially half said predetermined time interval after operation of said timing contact means; a relay ring for controlling said first-terminal start signals, said relay ring comprising a first-terminal relay for each of said first-terminal start signals, and energizing and holding means therefor effective upon operation of said timing contact means to cause operation in sequence of each of said first-terminal relays to a predetermined circuit-controlling condition and to cause the remainder of said first-terminal relays to maintain a different circuit-controlling condition; a second-terminal start signal for each of said cars; a second terminal relay for each of said second-terminal start signals; and means effective when any of said first-terminal relays is in said predetermined circuit-controlling condition for causing operation of the corresponding second terminal relay upon operation of said auxiliary contact means.

18. In a system for providing dispatching signals for a plurality of elevator cars operable between a first terminal and a second terminal; a first-terminal start signal for each of said cars; a timing device having timing contact means operated repeatedly under time control; a relay ring for controlling said first-terminal start signals, said relay ring comprising a first-terminal relay for each of said first-terminal start signals, and energizing and holding means therefor effective upon operation of said timing contact means to cause operation in sequence of each of said first-terminal relays to a predetermined circuit-controlling condition and to cause the remainder of said first-terminal relays to maintain a different circuit-controlling condition; a second-terminal start signal for each of said cars; a second relay ring for controlling said second-terminal start signals, said second relay ring comprising a second-terminal relay for each of said second-terminal start signals, and second-terminal energizing and holding means for said second-terminal relays, said second-terminal energizing and holding means being effective upon operation of said timing contact means to cause operation in sequence of each of said second-terminal relays to a predetermined circuit-controlling condition and to cause the remainder of said second-terminal relays to maintain a different circuit-controlling condition; and means for rendering said second-terminal energizing and holding means ineffective and for controlling said second-terminal relays in accordance with corresponding first-terminal relays.

19. In a system for providing dispatching signals for a plurality of elevator cars, a start signal for each of said cars; timing contact means operated repeatedly under time control; high-speed contact means operated repeatedly at a more rapid rate than said timing contact means; a relay ring for controlling said start signals, said relay ring comprising a relay for each of said start signals, and energizing and holding means therefor effective upon operation of said timing contact means to cause operation in sequence of each of said relays to a predetermined circuit-controlling condition and to cause the remainder of said relays to maintain a different circuit-controlling condition; and means effective when one of said cars is out of service for effecting control of the corresponding relay by said high-speed contact means.

20. In a system for providing dispatching signals for a plurality of elevator cars operating to a terminal; a start signal for each of said cars; a car-position responsive element for each of said cars; timing contact means operated repeatedly under time control; high-speed contact means operated repeatedly at a more rapid rate than said timing contact means; a relay ring for controlling said start signals, said relay ring comprising a relay for each of said start signals, and energizing and holding means therefor effective upon operation of said timing contact means to cause operation in sequence of each of said relays to a predetermined circuit-controlling condition and to cause the remainder of said relays to maintain a different circuit-controlling condition; means for rendering said start signals effective when the corresponding car is in position to start and the corresponding relay is in said predetermined circuit-controlling condition; and means effective when any car arrives at said terminal and none of said start signals are in effective condition, for controlling said energizing and holding means by said high-speed contact means until said relay corresponding to the arriving car is put in said predetermined circuit-controlling condition.

HAROLD W. WILLIAMS.
CHARLES E. ELLIS, Jr.